US010086700B2

(12) United States Patent
Salter et al.

(10) Patent No.: US 10,086,700 B2
(45) Date of Patent: Oct. 2, 2018

(54) ILLUMINATED SWITCH (71) Applicant: Ford Global Technologies, LLC, Dearborn, MI (US)

(72) Inventors: Stuart C. Salter, White Lake, MI (US); Annette Lynn Huebner, White Lake, MI (US); Kristin Ann Hellman, Walled Lake, MI (US); Pietro Buttolo, Dearborn Heights, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 15/298,924

(22) Filed: Oct. 20, 2016

(65) Prior Publication Data

US 2018/0111546 A1 Apr. 26, 2018

(51) Int. Cl.
*F21V 9/16* (2006.01)
*B60Q 3/04* (2006.01)
*B60K 35/00* (2006.01)
*B60Q 3/02* (2006.01)

(52) U.S. Cl.
CPC ............ *B60K 35/00* (2013.01); *B60Q 3/0286* (2013.01); *B60Q 3/0293* (2013.01); *B60K 2350/1036* (2013.01); *B60K 2350/2008* (2013.01); *B60K 2350/2039* (2013.01); *B60K 2350/2086* (2013.01)

(58) Field of Classification Search
CPC .... B60Q 3/14; B60Q 3/82; F21V 9/16; F21V 23/0471; F21V 23/0485; H03K 17/962; H03K 2217/960755; H01G 5/011; B60K 2350/1024; B60K 2350/1028; B60K 2350/1036; B60K 2350/2039
See application file for complete search history.

(56) References Cited

U.S. PATENT DOCUMENTS

| 2,486,859 | A | 11/1949 | Meijer et al. |
| 5,053,930 | A | 10/1991 | Benavides |
| 5,434,013 | A | 7/1995 | Fernandez |
| 5,709,453 | A | 1/1998 | Krent et al. |
| 5,839,718 | A | 11/1998 | Hase et al. |
| 6,023,221 | A | 2/2000 | Michelotti |

(Continued)

FOREIGN PATENT DOCUMENTS

| CN | 101337492 A | 1/2009 |
| CN | 201169230 Y | 2/2009 |

(Continued)

*Primary Examiner* — Peggy Neils
(74) *Attorney, Agent, or Firm* — Vichit Chea; Price Heneveld LLP (57) ABSTRACT

A vehicle switch is provided herein. The vehicle switch includes a housing including an output window. A first light source and a second light source are disposed within the housing. The first light source emits excitation light of a first wavelength. The second light source emits excitation light of a second wavelength. A proximity switch assembly is positioned within the housing and is configured to control a vehicle feature. A first luminescent structure is disposed rearwardly of the output window and luminesces in response to excitation light of the first wavelength when the feature is in a first state. A second luminescent structure is disposed rearwardly of the output window and is configured to luminesce in response to excitation light of the second wavelength when the feature is in a second state.

20 Claims, 8 Drawing Sheets

(56) References Cited

U.S. PATENT DOCUMENTS

| | | | |
|---|---|---|---|
| 6,031,511 A | 2/2000 | DeLuca et al. | |
| 6,117,362 A | 9/2000 | Yen et al. | |
| 6,294,990 B1 | 9/2001 | Knoll et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,805,506 B2 | 10/2004 | Bar-Yona | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,249,869 B2 | 7/2007 | Takahashi et al. | |
| 7,264,366 B2 | 9/2007 | Hulse | |
| 7,264,367 B2 | 9/2007 | Hulse | |
| 7,294,033 B1 | 11/2007 | Chen et al. | |
| 7,332,704 B2 | 2/2008 | Lien et al. | |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,582,840 B2 * | 9/2009 | Lerenius | G06F 3/0202 200/310 |
| 7,635,212 B2 | 12/2009 | Seidler | |
| 7,726,856 B2 | 6/2010 | Tsutsumi | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,118,441 B2 | 2/2012 | Hessling | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,169,131 B2 | 5/2012 | Murazaki et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,261,686 B2 | 9/2012 | Birman et al. | |
| 8,286,378 B2 | 10/2012 | Martin et al. | |
| 8,317,329 B2 | 11/2012 | Seder et al. | |
| 8,317,359 B2 | 11/2012 | Harbers et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,459,832 B2 | 6/2013 | Kim | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,539,702 B2 | 9/2013 | Li et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,730,186 B2 * | 5/2014 | Tamura | G06F 3/0412 345/173 |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,905,610 B2 | 12/2014 | Coleman et al. | |
| 8,952,341 B2 | 2/2015 | Kingsley et al. | |
| 8,994,495 B2 | 3/2015 | Dassanayake et al. | |
| 9,006,751 B2 | 4/2015 | Kleo et al. | |
| 9,018,833 B2 | 4/2015 | Lowenthal et al. | |
| 9,057,021 B2 | 6/2015 | Kingsley et al. | |
| 9,059,378 B2 | 6/2015 | Verger et al. | |
| 9,065,447 B2 | 6/2015 | Buttolo et al. | |
| 9,187,034 B2 | 11/2015 | Tarahomi et al. | |
| 9,299,887 B2 | 3/2016 | Lowenthal et al. | |
| 9,315,148 B2 | 4/2016 | Schwenke et al. | |
| 9,475,427 B2 * | 10/2016 | Tahara | H03K 17/962 |
| 9,568,659 B2 | 2/2017 | Verger et al. | |
| 9,616,812 B2 | 4/2017 | Sawayanagi | |
| 2002/0159741 A1 | 10/2002 | Graves et al. | |
| 2002/0163792 A1 | 11/2002 | Formoso | |
| 2003/0167668 A1 | 9/2003 | Fuks et al. | |
| 2003/0179548 A1 | 9/2003 | Becker et al. | |
| 2004/0213088 A1 | 10/2004 | Fuwausa | |
| 2005/0084229 A1 | 4/2005 | Babbitt et al. | |
| 2005/0189795 A1 | 9/2005 | Roessler | |
| 2006/0087826 A1 | 4/2006 | Anderson, Jr. | |
| 2006/0097121 A1 | 5/2006 | Fugate | |
| 2007/0032319 A1 | 2/2007 | Tufte | |
| 2007/0285938 A1 | 12/2007 | Palmer et al. | |
| 2007/0297045 A1 | 12/2007 | Sakai et al. | |
| 2008/0205075 A1 | 8/2008 | Hikmet et al. | |
| 2009/0217970 A1 | 9/2009 | Zimmerman et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2010/0102736 A1 | 4/2010 | Hessling | |
| 2011/0012062 A1 | 1/2011 | Agrawal et al. | |
| 2011/0162945 A1 | 7/2011 | Chen | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0050979 A1 | 2/2013 | Van De Ven et al. | |
| 2013/0092965 A1 | 4/2013 | Kijima et al. | |
| 2013/0335994 A1 | 12/2013 | Mulder et al. | |
| 2014/0003044 A1 | 1/2014 | Harbers et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0211498 A1 | 7/2014 | Cannon et al. | |
| 2014/0264396 A1 | 9/2014 | Lowenthal et al. | |
| 2014/0266666 A1 | 9/2014 | Habibi | |
| 2014/0320200 A1 * | 10/2014 | Dohi | H03K 17/962 327/517 |
| 2014/0373898 A1 | 12/2014 | Rogers et al. | |
| 2015/0046027 A1 | 2/2015 | Sura et al. | |
| 2015/0109602 A1 | 4/2015 | Martin et al. | |
| 2015/0138789 A1 | 5/2015 | Singer et al. | |
| 2015/0138820 A1 * | 5/2015 | Salter | F21V 9/16 362/510 |
| 2015/0199041 A1 * | 7/2015 | Salter | G06F 3/042 345/174 |
| 2015/0267881 A1 | 9/2015 | Salter et al. | |
| 2015/0307033 A1 | 10/2015 | Preisler et al. | |
| 2016/0016506 A1 | 1/2016 | Collins et al. | |
| 2016/0102819 A1 | 4/2016 | Misawa et al. | |
| 2016/0131327 A1 | 5/2016 | Moon et al. | |
| 2016/0236613 A1 | 8/2016 | Trier | |
| 2017/0158125 A1 | 6/2017 | Schuett et al. | |
| 2017/0344178 A1 * | 11/2017 | Vekhter | G06F 3/0416 |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |

(56) References Cited

FOREIGN PATENT DOCUMENTS

| | | |
|---|---|---|
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

ILLUMINATED SWITCH

FIELD OF THE INVENTION

The present invention generally relates to switches, and more particularly, to illuminated switches.

BACKGROUND OF THE INVENTION

Vehicles typically include a variety of switches which control various functions of the vehicle. Illumination and designation of the switch may provide an aesthetically pleasing appearance to the vehicle.

SUMMARY OF THE INVENTION

According to one aspect of the present invention, a vehicle switch is disclosed. The vehicle switch includes a housing including an output window. A first light source and a second light source are disposed within the housing. The first light source emits excitation light of a first wavelength. The second light source emits excitation light of a second wavelength. A proximity switch assembly is positioned within the housing and is configured to control a vehicle feature. A first luminescent structure is disposed rearwardly of the output window and luminesces in response to excitation light of the first wavelength when the feature is in a first state. A second luminescent structure is disposed rearwardly of the output window and is configured to luminesce in response to excitation light of the second wavelength when the feature is in a second state.

According to another aspect of the present invention, a vehicle switch is disclosed. The vehicle switch includes a capacitive sensor that is configured to switch a vehicle feature between a first state and a second state. A first luminescent structure on the switch luminesces in response to a first excitation light when the feature is in the first state. A second luminescent structure on the switch luminesces in response to a second excitation light when the feature is in the second state.

According to yet another aspect of the present invention, a switch is disclosed. The switch includes a housing defining an output window. First and second luminescent structures are disposed rearwardly of the output window. A light source is disposed within the switch. The first luminescent structure luminesces when the light source emits a first wavelength of light and the second luminescent structure luminesces when the light source emits a second wavelength of light.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
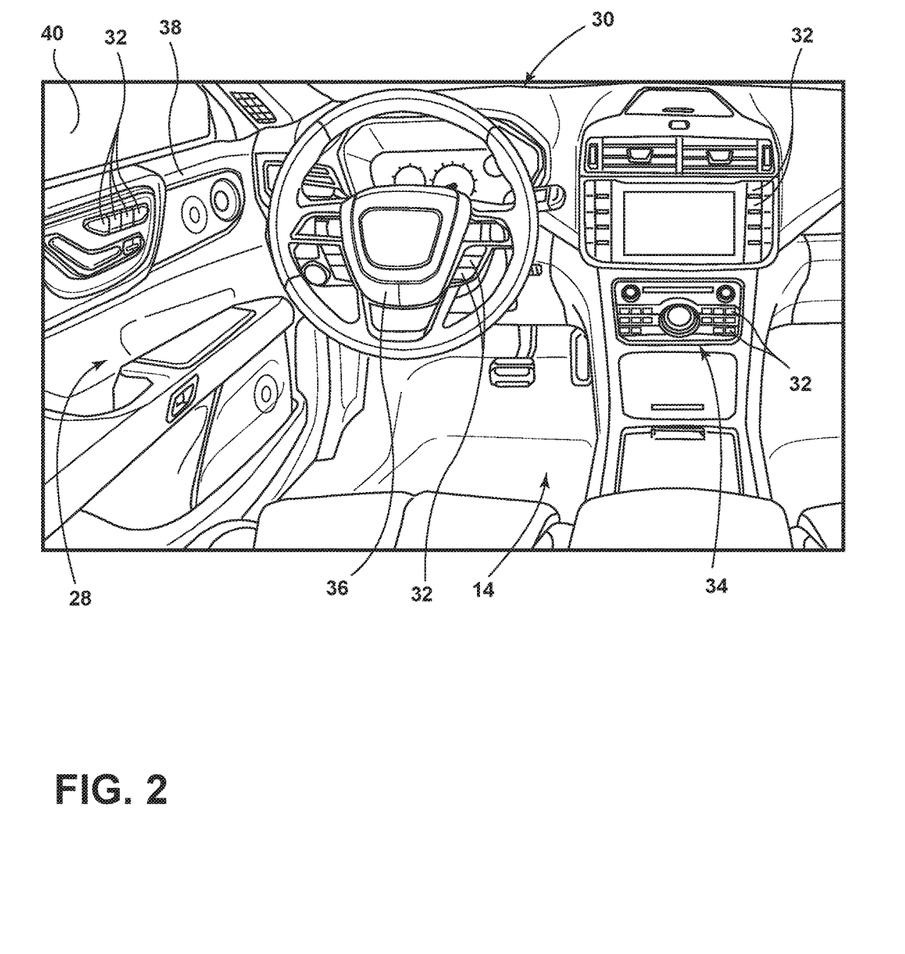
FIG. 2 is a partial perspective view of an interior of a vehicle including a plurality of switches therein, according to one embodiment.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated switch. The switch may advantageously employ one or more phosphorescent and/or luminescent structures to illuminate in response to predefined events. The one or more luminescent structures may be configured to convert excitation light received from an associated light source and re-emit the light at a different wavelength typically found in the visible spectrum.

Figure 1A:
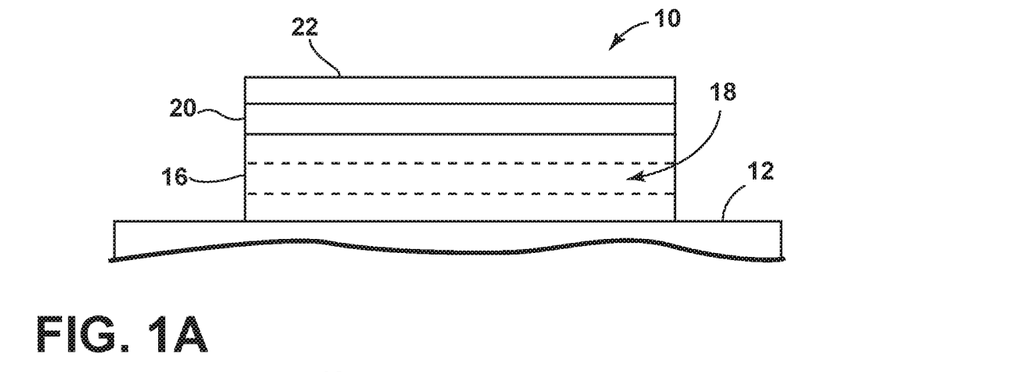
FIG. 1A is a side view of a luminescent structure rendered as a coating for use in a luminescent latch assembly according to one embodiment.
Figure 1B:
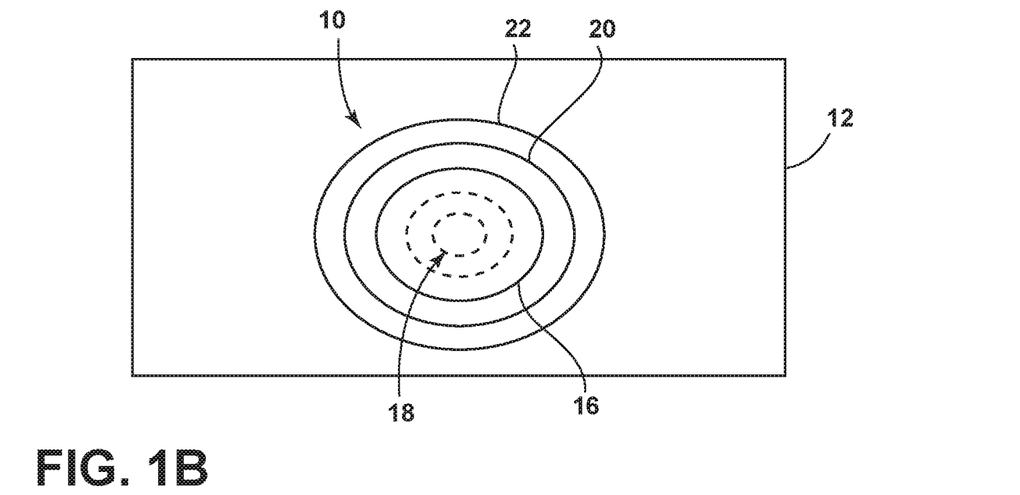
FIG. 1B is a top view of a luminescent structure rendered as a discrete particle according to one embodiment.
Figure 1C:
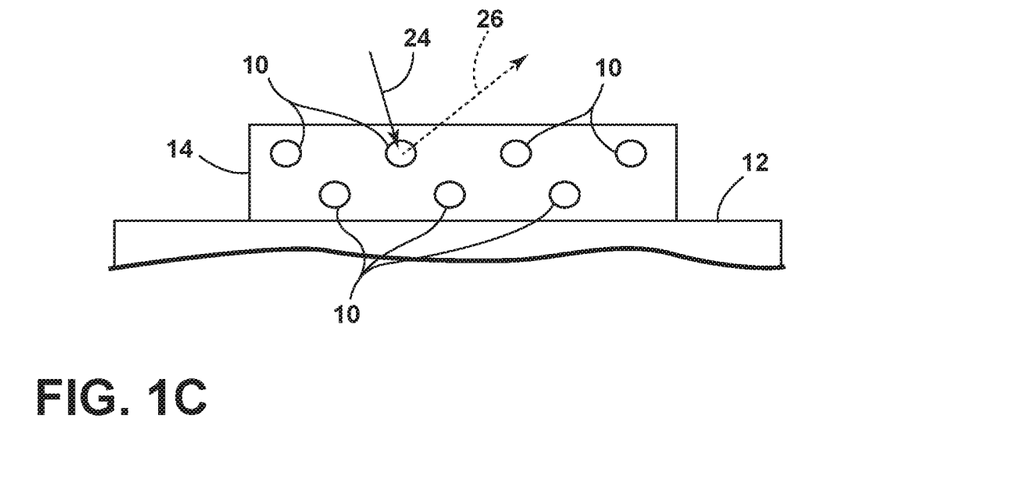
FIG. 1C is a side view of a plurality of luminescent structures rendered as discrete particles and incorporated into a separate structure.

Referring to FIGS. 1A-1C, various exemplary embodiments of luminescent structures 10 are shown, each capable of being coupled to a substrate 12, which may correspond to a vehicle fixture or vehicle related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown through broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

Light emitted by a light source 42 (FIG. 4) is referred to herein as excitation light 24 and is illustrated herein as solid arrows. In contrast, light emitted from the luminescent structure 10 is referred to herein as luminescence by the luminescent structure 10, or converted light 26, and is illustrated herein as broken arrows. The mixture of excitation light 24 and converted light 26 that may be emitted simultaneously is referred to herein as emitted light.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of luminescent structures 10 is disclosed in U.S. Pat. No. 8,232,533 to Kingsley et al., the entire disclosure of which is incorporated herein by reference. For additional information regarding fabrication and utilization of luminescent materials to achieve various light emissions, refer to U.S. Pat. No. 8,207,511 to Bortz et al., U.S. Pat. No. 8,247,761 to Agrawal et al., U.S. Pat. No. 8,519,359 to Kingsley et al., U.S. Pat. No. 8,664,624 to Kingsley et al., U.S. Patent Publication No. 2012/0183677 to Agrawal et al., U.S. Pat. No. 9,057,021 to Kingsley et al., and U.S. Pat. No. 8,846,184 to Agrawal et al., all of which are incorporated herein by reference in their entirety.

According to one embodiment, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the luminescent material 18 with ultra-short persistence characteristics, which can emit the converted light 26 by absorbing purple to blue excitation light 24 emitted from a light source 42. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence luminescent material known in the art may be utilized without departing from the teachings provided herein. Additional information regarding the production of short persistence luminescent materials is disclosed in U.S. Pat. No. 8,163,201 to Kingsley et al. the entire disclosure of which is incorporated herein by reference.

Additionally, or alternatively, the luminescent material 18, according to one embodiment, disposed within the luminescent structure 10 may include a long persistence luminescent material 18 that emits the converted light 26, once charged by the excitation light 24. The excitation light 24 may be emitted from any excitation source (e.g., any natural light source, such as the sun, and/or any artificial light source). The long persistence luminescent material 18 may be defined as having a long decay time due to its ability to store the excitation light 24 and release the converted light 26 gradually, for a period of several minutes or hours, once the excitation light 24 is no longer present.

The long persistence luminescent material 18, according to one embodiment, may be operable to emit light at or above an intensity of 0.32 mcd/m$^2$ after a period of 10 minutes. Additionally, the long persistence luminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistence luminescent material 18 may continually illuminate in response to excitation from any light source 42 that emits the excitation light 24, including, but not limited to, natural light sources (e.g., the sun) and/or any artificial light source. The periodic absorption of the excitation light 24 from any excitation source may provide for a substantially sustained charge of the long persistence luminescent material 18 to provide for consistent passive illumination. In some embodiments, a light sensor may monitor the illumination intensity of the luminescent structure 10 and actuate an excitation source when the illumination intensity falls below 0.32 mcd/m$^2$, or any other predefined intensity level.

The long persistence luminescent material 18 may correspond to alkaline earth aluminates and silicates, for example doped di-silicates, or any other compound that is capable of emitting light for a period of time once the excitation light 24 is no longer present. The long persistence luminescent material 18 may be doped with one or more ions, which may correspond to rare earth elements, for example, $Eu^{2+}$, $Tb^{3+}$ and/or $Dy^3$. According to one non-limiting exemplary embodiment, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to one embodiment, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long persistence phosphor known in the art may also be utilized without departing from the teachings provided herein.

Additional information regarding the production of long persistence luminescent materials is disclosed in U.S. Pat. No. 8,163,201 to Agrawal et al., the entire disclosure of which is incorporated herein by reference. For additional information regarding long persistence phosphorescent structures, refer to U.S. Pat. No. 6,953,536 to Yen et al., U.S. Pat. No. 6,117,362 to Yen et al., and U.S. Pat. No. 8,952,341 to Kingsley et al., all of which are incorporated herein by reference in their entirety.

Figure 3:
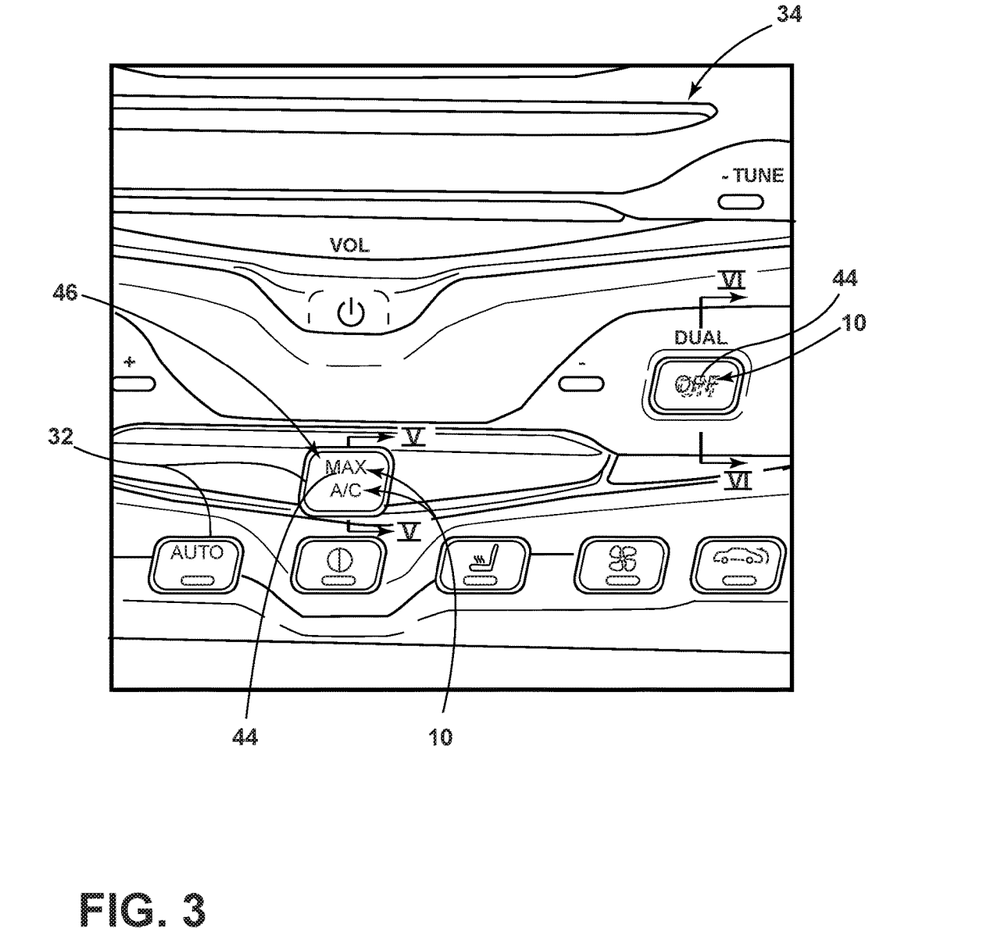
FIG. 3 is an enhanced view of the switches of the vehicle, according to one embodiment.

Referring now to FIGS. 2 and 3, an interior 28 of a vehicle 30 is generally illustrated having a plurality of switches 32 disposed therein. For example, the switches may be incorporated into a human machine interface (HMI) 34, or infotainment system, a steering wheel 36, and/or a door panel 38. The switches 32 may actuate any number of vehicle features, such as up and down articulation of a window 40, side view mirror adjustment, door locks, cruise control, volume, trip information, heads-up display adjustments, media controls, navigation controls, occupant feature preferences and settings, air conditioning, fan speed, defrost, clock adjustment, etc. between a first state and a second state. In some embodiments, the switch 32 is positioned on an exterior of the vehicle 30. In such embodiments, the switch 32 may be used as an entry keypad, a locking feature, truck or tailgate activation, hood release and/or other switches that may be present on an exterior of the vehicle 30.

The switch 32 may include a light source 42 (FIG. 4) to provide illumination thereto. The illumination of the switch 32 may be desirable to enhance the visibility of the switch 32, to provide information about usage or function of the switch 32, and/or to provide an aesthetically pleasing light. The light source 42 may cause indicia 44 on the switch 32 to luminesce. The indicia 44 may provide any desired information, including, but not limited to, the function of the switch 32, the current state of the device that the switch controls, and/or the setting of the device that the switch controls. For example, when a setting, such as dual climate control, is placed in the ON state, indicia 44 stating "ON" may luminesce. Alternatively, when the setting, such as the dual climate control, is placed in the OFF state, indicia 44 stating "OFF" may luminesce. Moreover, indicia 44 stating "OFF" may luminesce when the vehicle feature is in the ON state to notify an occupant of the switch 32 that will turn the vehicle feature OFF, or vice versa.

The indicia 44 may be defined by one or more luminescent structures 10. The one or more luminescent structures 10 may be disposed rearwardly of the light transmissive output window 46 and luminesce in response to receiving excitation light 24 of a specific wavelength to illuminate the indicia 44. In some embodiments, the indicia 44 may be defined by the one or more luminescent structures 10 and configured to provide information to an occupant of the vehicle 30 when the associated light source 42 emits excitation light 24 of a specific wavelength causing the one or more luminescent structures 10 to luminesce.

As will be described in greater detail below, in some embodiments, the switch 32 may be configured as a proximity switch. The proximity switch provides a sense activation field 50 to sense contact or close proximity (e.g., within one millimeter) of an object, such as the hand 94 (e.g., palm or finger(s)) of an operator in relation to the proximity switch 48. The proximity switch 48 may also detect a swiping motion by the hand 94 of the operator such as a swipe of the thumb or other finger. It will be appreciated by those skilled in the art that additional or alternative types of proximity switches can be used, such as, but not limited to, capacitive sensors, inductive sensors, optical sensors, temperature sensors, resistive sensors, the like, or a combination thereof. Exemplary proximity switches are described in the Apr. 9, 2009, ATMEL® Touch Sensors Design Guide, 10620 D-AT42-04/09, the entire reference is incorporated herein by reference.

It will be appreciated that the switch 32 may alternatively be a mechanical switch of any type known in the art, such as a push button. In push button embodiments, a membrane may be provided as a seal over the switch 32. Depression of the membrane causes depression of a plunger on the switch 32. Internal switch contacts then change positions to provide an output signal.

Figure 4:
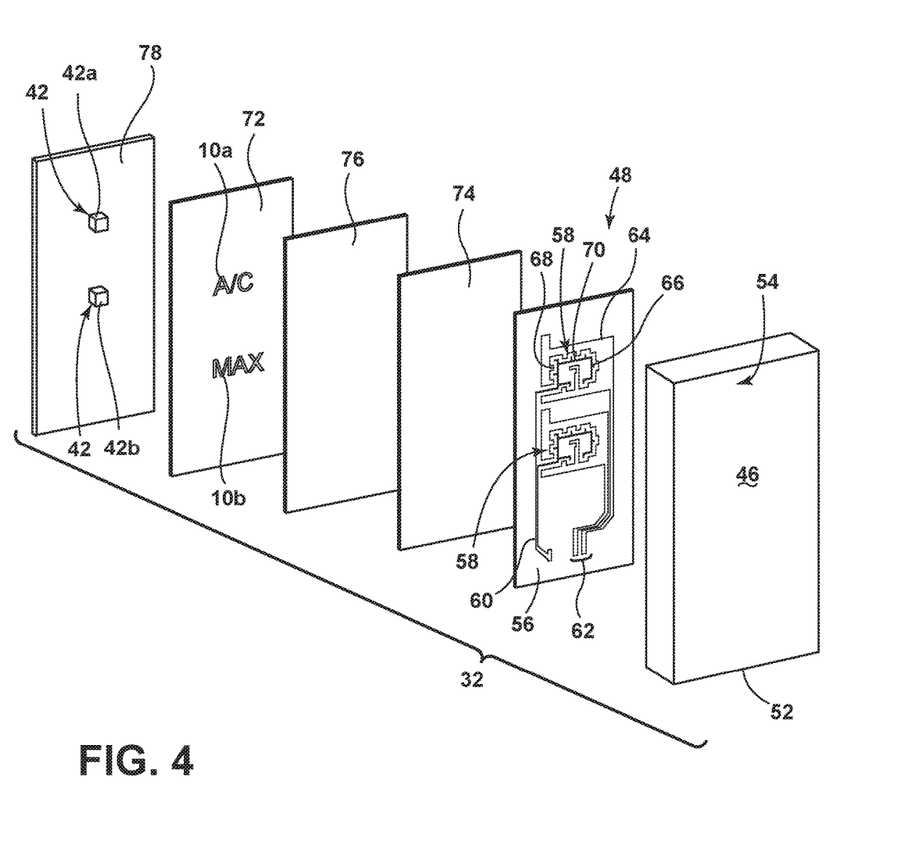
FIG. 4 is an exploded view of one of the switches of FIG. 3, according to one embodiment.

Referring to FIG. 4, the switch 32 is illustrated as a capacitive switch 48 that includes a front housing 52 generally defining the output window 46 therein. The output window 46 may be a light transmissive medium that is capable of being illuminated and viewed from an A-surface 54. The light transmissive medium may include a translucent and/or transparent output window 46 such as glass or a light bar, according to various embodiments. In some embodiments, the housing 52 and/or the output window 46 may be a static component while the switch 32 is activated and deactivated.

Disposed behind the output window 46 is a capacitive sensor circuit board 56 which includes one or more capacitive sensors 58 and interconnecting electrode lead lines 60 and 62. The capacitive sensors 58 and electrical lead lines 60 and 62 may be formed of a printed conductive ink or indium tin oxide (ITO) which may be made of a visibly transparent ink, according to specific embodiments. The conductive elements of the capacitive sensors 58 and electrical lead lines 60 and 62 may be formed of copper such as flexible copper circuitry, according to another embodiment. The capacitive sensors 58 are formed of first and second electrodes each having electrode fingers 68, 70 which are generally aligned with the output window 46.

The electrical lead lines 60 and 62 connect to the electrodes of each capacitive sensor 58 to transmit and receive signals. The electrical lead line 60 is shown connecting to the drive electrode of the capacitive sensor 58. The electrical lead line 60 has an input at the bottom terminal end which may connect to control circuitry that supplies a drive signal. The electrical lead line 62 includes respective lead lines that connect to respective receive electrodes of the capacitive sensor 58. Accordingly, in embodiments having more than one capacitive sensor, each capacitive sensor 58 has its separate lead line 62 which connects or is coupled to control circuitry for processing the signals generated by the corresponding capacitive sensors 58.

Figure 5:
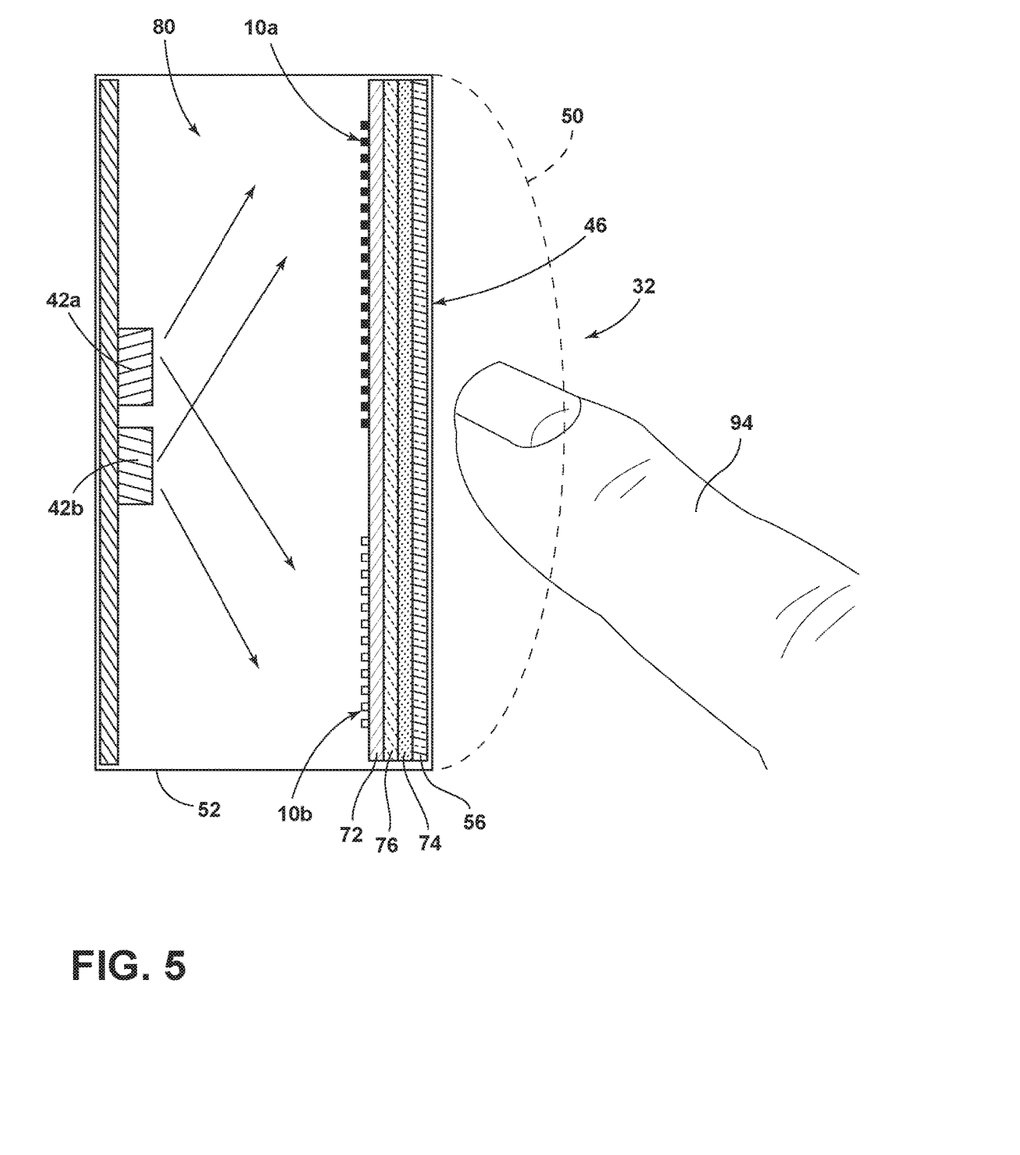
FIG. 5 is a cross-sectional view of the switch taken along the line V-V of FIG. 3, according to one embodiment.

As seen in FIG. 4, each of the capacitive sensors 58 includes a first electrode 64 and a second electrode 66. Each of the first and second electrodes 64 and 66 includes a plurality of conductive electrode fingers 68 and 70, respectively. As such, the first electrode 64 has a first electrode fingers 68 and the second electrode 66 has a second plurality of electrode fingers 70. Each of the plurality of first and second electrode plurality of fingers 68 and 70 is generally positioned to be interdigitated or interlaced with the other of the first and second electrode fingers 68 and 70 to some degree to generate a capacitive activation field 50 (FIG. 5) for sensing the presence of an object such as a user's hand 94 (FIG. 5). The first electrode 64 may be configured as a receive electrode and receives a sense signal, and the second electrode 66 may be configured as a drive electrode to receive a drive signal.

The capacitive sensors 58 each provide a capacitive sense activation field 50 to sense contact or close proximity (e.g., within one mm) of a user (e.g., finger) in relation to the corresponding capacitive sensor. The capacitive sense activation field 50 of each capacitive sensor 58 detects a user's finger which has electrical conductivity and dielectric properties that cause a change or disturbance in the capacitive sense activation field 50 as should be evident to those skilled in the art.

A light transmissive film 72 may be disposed rearwardly of the capacitive sensor circuit board 56. The film 72 includes the indicia 44 thereon that notify an occupant of the vehicle feature that is actuated by the respective switch 32. The indicia 44 may be defined by a first and/or a second luminescent structure 10a, 10b. The first and/or second luminescent structures 10a, 10b luminesce in response to receiving excitation light 24 of a predefined wavelength from an associated light source 42 and/or a plurality of light sources 42a, 42b.

The light sources 42a, 42b may be operably coupled with a printed circuit board (PCB) 78 having control circuitry including drive circuitry for controlling activation and deactivation of first and second light sources 42a, 42b. The PCB 78 may be any type of circuit board including, but not limited to, any flexible PCB and/or rigid PCB.

With respect to the embodiments described herein, the first and second light sources 42a, 42b may each be configured to emit non-visible light, such as blue light, UV light, infrared light (IR), and/or violet light and may include any form of light source. For example fluorescent lighting, light emitting diodes (LEDs), organic LEDs (OLEDs), polymer LEDs (PLEDs), solid state lighting, or any other form of lighting configured to emit excitation light 24 may be utilized. In response to receiving excitation light 24, the first and second luminescent structures 10a, 10b may be configured to luminesce in the visible spectrum. For example, the first light source may emit a first wavelength of excitation light 24 that only causes the first luminescent structure 10a to luminesce. Similarly, the second light source may emit excitation light 24 of a second wavelength that only excites the second luminescent structure 10b. Accordingly, based on the feature that is controlled by the switch 32 and is currently in the state identified by the indicia 44, the switch 32 may selectively provide information about more than one feature state and/or information about more than one vehicle feature within a single switch 32.

In some embodiments, the first and second luminescent structures 10a, 10b each have substantially different (e.g., non-overlapping and/or offset) absorbance and/or luminesce wavelength spectrums. For example, in some embodiments, the first luminescent structure 10a may be a phosphor material while the second luminescent structure 10b may be a dye. It will be appreciated that the switch 32 may include one or more sensors, luminescent structures 10a, 10b, and/or light sources 42a, 42b without departing from the scope of the present disclosure.

Referring to FIG. 5, the housing 52, according to one embodiment, may be composed of a polymeric material configured to function as a base for the various components of the switch 32. It will be understood that the housing 52 may additionally, and/or alternatively, be composed of a variety of materials depending on the location of the switch 32 (e.g., metal, wood, etc.). The output window 46 may include a variety of films, coatings, or colorants to provide an aesthetically pleasing appearance to the interior 28 or exterior of the vehicle 30. The housing 52 may also be configured to contain the excitation light 24 within the housing 52 and the light filter 76.

With further reference to FIG. 4, a diffusive layer 74 is disposed rearwardly of the capacitive switch board. A light filter 76 is disposed rearwardly of the diffusive layer 74 and is configured to absorb excitation light 24.

As illustrated in FIG. 5, the housing 52 may have any desired height. In some embodiments, the first and second light sources 42a, 42b are separated from the first and second luminescent structures 10a, 10b by a gap 80 such that light emitted from the first or second light source 42a, 42b may be reflected off of both opposing sides of the housing 52. Moreover, the gap 80 may increase the sensitivity of the proximity switch.

The capacitive sensor circuit board 56 is disposed rearwardly of the output window 46 and/or the housing 52 of the switch 32. The diffusive layer 74 is disposed rearwardly of the capacitive sensor circuit board 56. The diffusive layer 74 may be configured as a one or two side diffuser film that is designed to break up and distribute light evenly so that hot spots and shadows may be eliminated. The diffusive layer 74 may have any desired light transparency and haze. For example, the diffusive layer 74 may have a light transparency between 30% and 95% and a haze that may be above 70%, particularly above 75%, and more particularly 80% or above.

The diffusive layer 74, and any other layer or component described herein, may be adhered to adjacent layers and/or components through an adhesive layer. The adhesive layer may be an optically clear adhesive. As used herein, the term "optically clear" refers to an adhesive that has a high light transmittance over at least a portion of the visible light spectrum (about 400 to about 700 nanometers), and that exhibits low haze. Both the luminous transmission and the haze can be determined using, for example, the method of ASTM-D 1003-95. In one embodiment, the adhesive has about 10% haze or less, particularly about 5% haze or less, and more particularly about 2% haze or less.

The light filter 76 may be disposed rearwardly of the diffusive layer 74. The light filter 76 may be embodied as a film that is configured to absorb excitation light 24 that is emitted from the one or more light sources 42a, 42b disposed within the switch 32. For example, according to one embodiment, the first light source 42a may emit UV light while the second light source 42b emits blue light, both of which may be absorbed and or reflected by the light filter 76. In alternative embodiments, the light filter 76 may be configured to absorb light of any other wavelength(s). In embodiments incorporating the light filter 76, the first and/or second light sources 42a, 42b may emit high intensities of excitation light 24 without the light exciting the housing 52 though the output window 46.

The clear film 72 having the one or more luminescent structures 10a, 10b thereon is disposed rearwardly of the light filter 76. As provided herein, the switch 32 includes one or more light sources 42a, 42b that emit excitation light 24 towards the one or more luminescent structures 10a, 10b such that the one or more luminescent structures 10a, 10b luminesce to provide information about the switch 32 and/or the vehicle feature controlled by the switch 32 to an occupant of the vehicle 30.

As illustrated in FIG. 5, the proximity switch assembly 48 is configured to emit an activation field 50. The activation field 50 extends outwardly from the switch 32. According to various embodiments, the sensors of the proximity switch assembly 48 are activated when an object such as a finger proximate to or in contact with the switch 32 interferes with the activation field 50. The distance in which the activation field 50 extends may be tuned.

In operation, the one or more luminescent structures 10a, 10b define indicia 44 that luminesce in response to receiving light of a specific wavelength. Accordingly, when a first indicia 44 is to luminesce, the first light source 42a may emit excitation light 24 of a first wavelength thereby providing information to an occupant about any vehicle feature. When a second indicia 44 is to be illuminated, the second light source 42b may emit excitation light 24 of a second wavelength to provide additional information to an occupant about the same vehicle feature and/or an additional vehicle feature. The first and second light sources 42a, 42b may be independently illuminated, or simultaneously illuminated. Moreover, a single light source 42 may be configured to emit one or more wavelengths of light to excite the one or more luminescent structures 10a, 10b within the switch 32.

For example, an air conditioner embodiment of the switch 32 may be represented by the first luminescent structure 10a stating "A/C" and the second luminescent structure 10b may state "MAX." In such embodiments, the first luminescent structure 10a may luminesce when the air conditioner is in an ON state and the first and second luminescent structures 10a, 10b luminesce simultaneously when the air conditioning is in an ON state and in the maximum output setting. It will be appreciated that an additional light source 42 may backlight one or both of the indicia 44 when the vehicle feature, such as the air conditioning, is in the off setting in any color.

Figure 6:
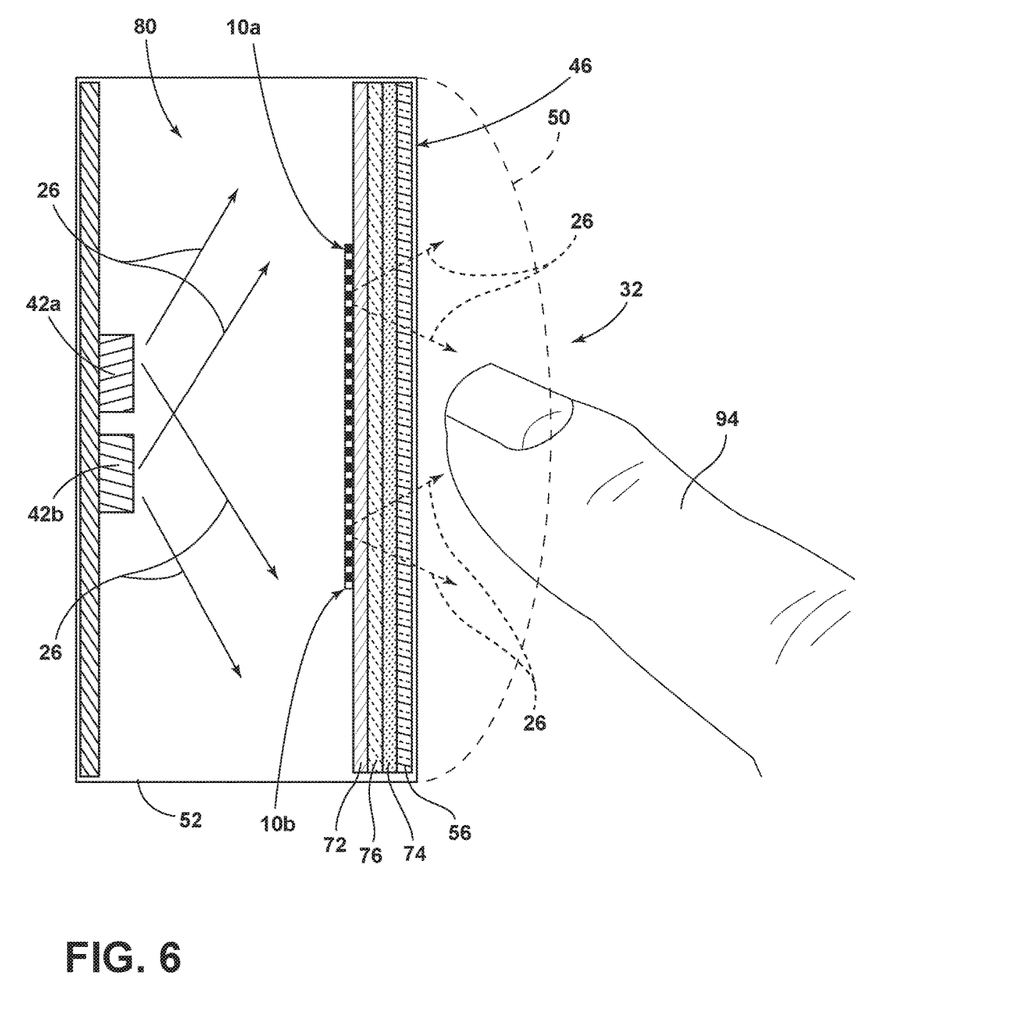
FIG. 6 is a cross-sectional view of the switch taken along the line VI-VI of FIG. 3, according to an alternate embodiment.
Figure 7:
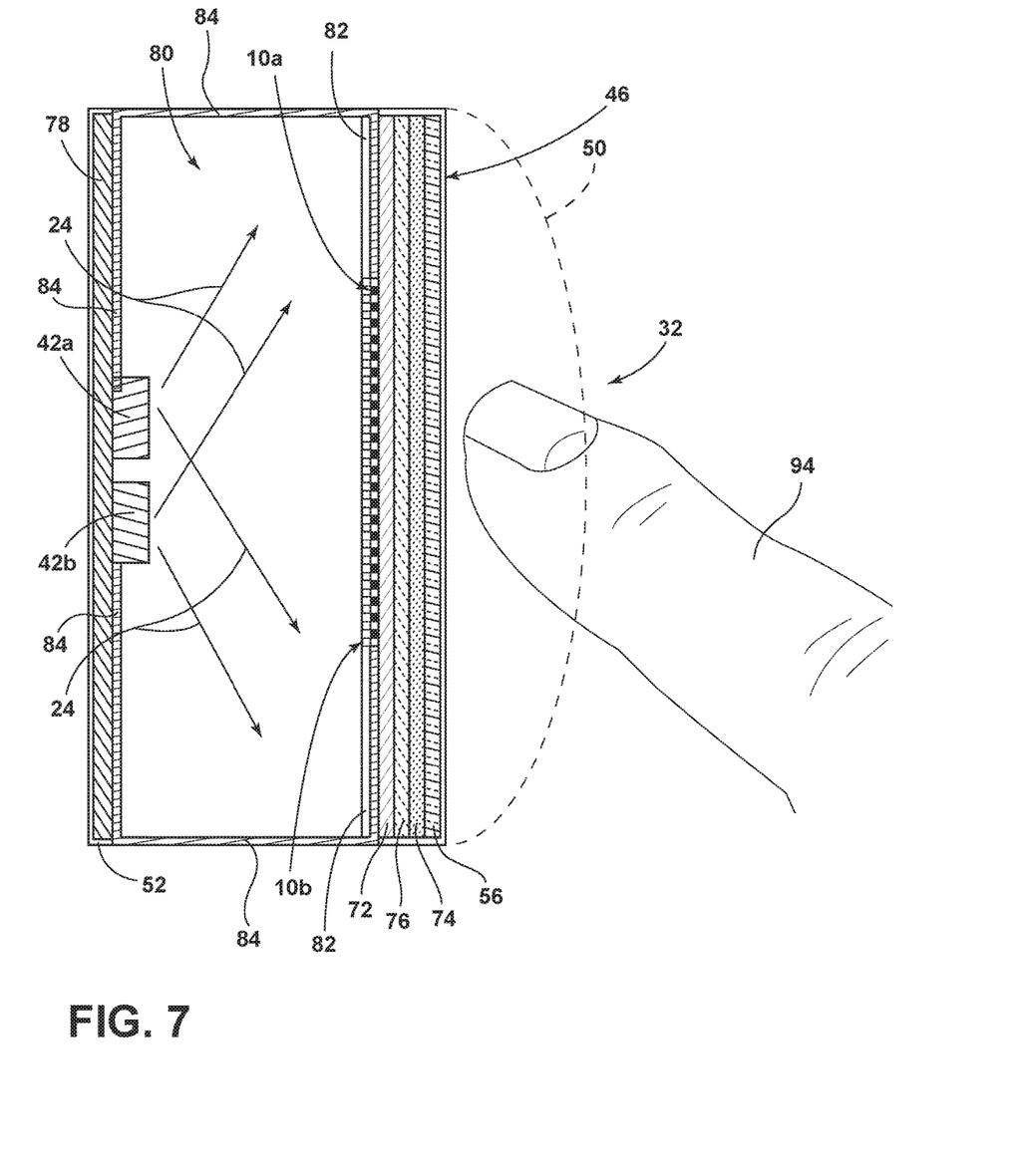
FIG. 7 is a cross-sectional view of the switch, according to an alternate embodiment, taken along the line VI-VI of FIG. 3.

Referring to FIGS. 6 and 7, the first and second luminescent structures 10a, 10b may be interspersed such that both indicia 44 may luminesce in a common position on the output window 46. According to one embodiment, the first luminescent structure 10a may be illuminated when the feature controlled by the button is in the OFF state and the second luminescent structure 10b may be illuminated when the feature controlled by the switch 32 is in the ON state.

As illustrated in FIG. 6, the first and second luminescent structures 10a, 10b may each be disposed on a common transparent or translucent film 72. Alternatively, as illustrated in FIG. 7, the first luminescent structure 10a may be coupled to a first film 72 and the second luminescent structure 10b may be coupled to a second film 82.

With reference to FIG. 6, the first and second luminescent structures 10a, 10b exemplarily shown may not be to scale. Accordingly, the first and second luminescent structures 10a, 10b may be of any size and interspersed in any fashion such that more than one indicia 44 may illuminate in a common location without departing from the scope of the present disclosure.

With reference to FIG. 7, a reflective material 84 may be disposed on the PCB 78 and/or an interior portion of the housing 52. The reflective material 84 may be configured to reflect excitation light 24 that is emitted from the one or more light sources 42a, 42b back towards the first and second luminescent structures 10a, 10b. The reflective material 84 may include any material known in the art, including, but not limited to, reflective paint.

Figure 8:
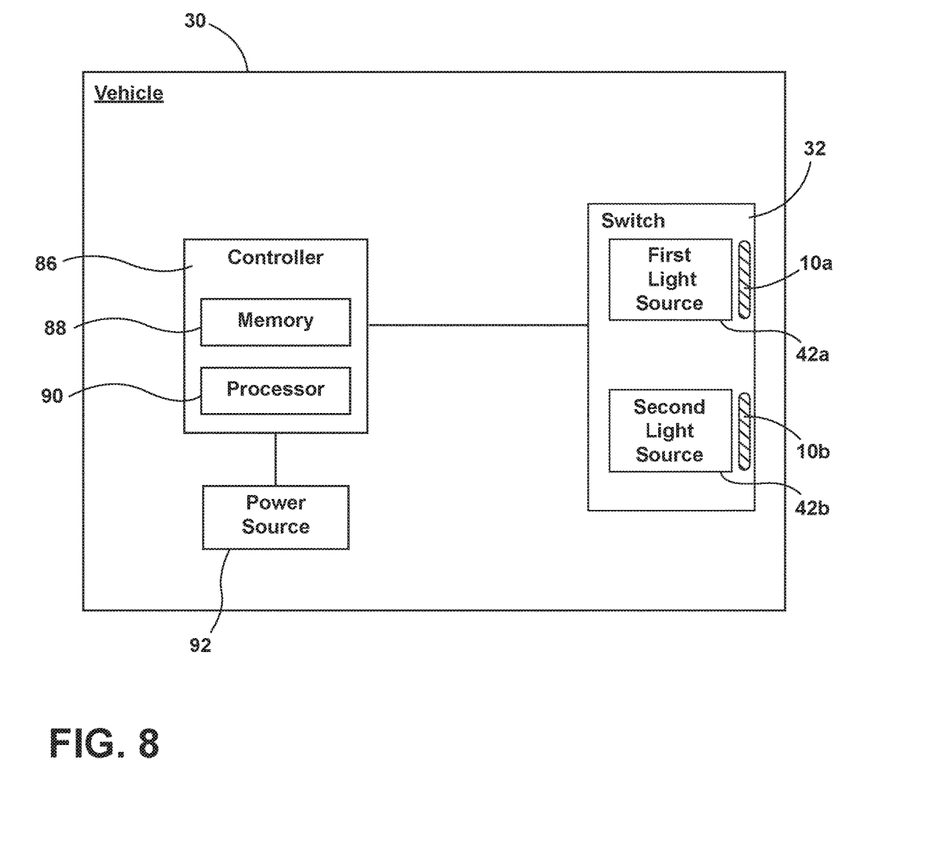
FIG. 8 is a block diagram further illustrating the vehicle, according to one embodiment.

Referring to FIG. 8, a box diagram of the vehicle 30 is depicted in which the switch 32 is implemented. The vehicle 30 includes a controller 86 in communication with the switch 32. The controller 86 may include a memory 88 having instructions contained therein that are executed by a processor 90 of the controller 86. The controller 86 may provide electrical power to the switch 32 via a power source 92 located onboard the vehicle 30. In addition, the controller 86 may be configured to control the light output of each of the first and second light sources 42a, 42b based on the current status of the vehicle feature that is controllable by the switch 32. The memory 88 may include a variety of routines configured to vary the color and intensity of excitation light 24 emitted by the first and/or second light sources 42a, 42b.

In operation, the switch 32 may include one or more light sources 42a, 42b that may emit excitation light 24 of varying wavelengths, as provided herein. In response, the luminescent structures 10a, 10b may independently exhibit periodic unicolor or multicolor luminescence based on the wavelength of excitation light 24 emitted by the one or more light sources 42a, 42b. For example, according to one embodiment, the switch 32 determines if the vehicle feature controlled by the switch 32 is performing a first function. If so, the first light source 42a emits a first wavelength of excitation light 24 causing the first luminescent structure 10a to luminesce. If the vehicle feature is not performing a first function, the second light source 42b may emit excitation light 24 of a second wavelength causing the second luminescent structure 10b to luminesce.

In some embodiments, the first and second luminescent structures 10a, 10b may luminesce for a predetermined amount of time (e.g., two seconds) in an alternating manner and actuate different vehicle features based on which illumination is current when the switch 32 is actuated. Additionally, and/or alternatively, when an object is within a predefined distance (e.g. 10 mm) of the switch 32, the switch 32 may luminesce for a predetermined amount of time (e.g., two seconds) in an alternating manner to show the vehicle features controlled by the switch 32 and actuate the feature that is luminescing as the switch 32 is actuated.

With respect to the above examples, the controller 86 may modify the intensity of the emitted wavelengths of excitation light 24 by pulse-width modulation or current control. In some embodiments, the controller 86 may be configured to adjust a color of the excitation light 24 by sending control signals to adjust an intensity or energy output level of the first and second light sources 42a, 42b. For example, if the first and/or second light source 42a, 42b is configured to output the first wavelength at a low level, substantially all of the first wavelength may be converted to the second wavelength by the one or more luminescent structures 10a, 10b. If the first and/or second light source 42a, 42b is configured to output the first wavelength (i.e., excitation light 24) at a high level, only a portion of the first wavelength may be converted to the second wavelength (i.e., converted light 26). In this configuration, a color of light corresponding to mixture of the first wavelength and the second wavelength may be output as the emitted light. In this way, the controller 86 may control an output color of the emitted light.

Though a low level and a high level of intensity are discussed in reference to the first wavelength of excitation light 24, it shall be understood that the intensity of the first wavelength of excitation light 24 may be varied among a variety of intensity levels to adjust a hue of the color corresponding to the emitted light from the switch 32. The variance in intensity may be manually altered, or automatically varied by the controller 86 based on predefined conditions.

As described herein, the color of the converted light 26 may be significantly dependent on the particular luminescent materials 18 utilized in the luminescent structures 10a, 10b. Additionally, a conversion capacity of the luminescent structures 10a, 10b may be significantly dependent on a concentration of the luminescent material 18 utilized in the luminescent structures 10a, 10b. By adjusting the range of intensities that may be output from the first and/or second light source 42a, 42b, the concentration, types, and proportions of the luminescent materials 18 in the luminescent structures 10a, 10b discussed herein may be operable to generate a range of color hues of the emitted light by blending the various excitation light wavelengths with the various converted light wavelengths.

A variety of advantages may be derived from the use of the present disclosure. For example, use of the disclosed trim member provides a unique aesthetic appearance to the vehicle. Moreover, the trim member may provide additional visual information to the occupants of the vehicle. Lastly, through the usage of multiple light sources and/or multiple luminescent structures, a wide array of patterns and appearances may be conferred by the trim member.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited, to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle switch, comprising:
   a housing including an output window;
   a first light source and a second light source disposed within the housing, wherein the first light source emits excitation light of a first wavelength and the second light source emits excitation light of a second wavelength;
   a proximity switch assembly positioned between the first and second light sources and the output window, the proximity switch assembly configured to control a vehicle feature;
   a first luminescent structure disposed rearwardly of the output window and configured to luminesce in response to excitation light of the first wavelength when the feature is in a first state, wherein the first and second light sources are disposed at an equal distance from a film containing the first luminescent structure; and
   a second luminescent structure disposed rearwardly of the output window and configured to luminesce in response to excitation light of the second wavelength when the feature is in a second state.

2. The vehicle switch of claim 1, wherein the proximity switch assembly is configured to emit an activation field that detects an object in close proximity to the switch.

3. The vehicle switch of claim 2, wherein the first and second luminescent structures are interspersed with each other on the film and define indicia, wherein the first luminescent structure luminesces independently in the first state and the first and second luminescent structures luminesce simultaneously in the second state.

4. The vehicle switch of claim 1, further comprising:
   a diffusive layer between the proximity switch assembly and the first and second luminescent structures.

5. The vehicle switch of claim 4, further comprising:
   a light filter disposed between the diffusive layer and the first and second luminescent structures that are disposed on the film.

6. The vehicle switch of claim 5, wherein the first and second light sources are separated from the first and second luminescent structures such that light emitted from the first or second light source may be reflected off of both opposing sides of the housing.

7. The vehicle switch of claim 5, wherein the proximity switch assembly is configured as a capacitive switch comprising one or more capacitive sensors.

8. The vehicle switch of claim 7, wherein the capacitive switch includes a first plurality of electrode fingers that are interlaced with a second plurality of electrode fingers.

9. A vehicle switch, comprising:
   a capacitive sensor configured to switch a vehicle feature between first and second states;
   a first luminescent structure rearwardly of the capacitive sensor and configured to luminesce when the feature is in the first state; and
   a second luminescent structure rearwardly of the capacitive sensor and configured to luminesce when the feature is in the second state.

10. The vehicle switch of claim 9, wherein a first light source emits the first excitation light and a second light source emits the second excitation light.

11. The vehicle switch of claim 9, further comprising:
    a housing defining an output window through which the luminescence of the first and second luminescent structures may be visible to a vehicle occupant.

12. The vehicle switch of claim 9, wherein the first and second luminescent structures are interspersed on a film.

13. The vehicle switch of claim 9, wherein the first luminescent structure is disposed on a first film and the second luminescent structure is disposed on a second film, the second film disposed along an interior side of the first film.

14. The vehicle switch of claim 9, wherein the first and second luminescent structures define indicia.

15. A switch, comprising:
    a housing defining an output window;
    a sensor disposed rearwardly of the output window;
    first and second luminescent structures disposed rearwardly of the sensor;
    a light source disposed within the housing, wherein the first luminescent structure luminesces when the light source emits a first wavelength of light and the second luminescent structure luminesces when the light source emits a second wavelength of light; and a light filter and a diffusive layer disposed between the first and second luminescent structures and the sensor, the light filter configured to absorb excitation light that is emitted from the light source.

16. The switch of claim 15, wherein the first wavelength of light is emitted when a feature controlled by the switch is in a first state and the second wavelength of light is emitted when a feature controlled by the switch is in a second state.

17. The switch of claim 15, further comprising:
a capacitive switch comprising one or more capacitive sensors.

18. The switch of claim 17, wherein the capacitive sensor provides an activation field to detect contact or close proximity of an object to the switch.

19. The switch of claim 15, wherein the light source includes first and second LEDs that respectively emit the first and the second wavelength of light.

20. The switch of claim 15, wherein the first and second luminescent structures define indicia, the indicia emitting converted light through the light filter as the excitation light from the light source is absorbed by the light filter.

* * * * *